United States Patent
Yi et al.

(10) Patent No.: US 10,292,156 B2
(45) Date of Patent: May 14, 2019

(54) METHOD AND APPARATUS FOR INDICATING ON/OFF-STATE OF PAST SUBFRAMES IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Hanbyul Seo, Seoul (KR); Hyangsun You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 15/317,862

(22) PCT Filed: Jun. 12, 2015

(86) PCT No.: PCT/KR2015/005954
§ 371 (c)(1),
(2) Date: Dec. 9, 2016

(87) PCT Pub. No.: WO2015/190876
PCT Pub. Date: Dec. 17, 2015

(65) Prior Publication Data
US 2017/0142711 A1 May 18, 2017

Related U.S. Application Data

(60) Provisional application No. 62/011,091, filed on Jun. 12, 2014, provisional application No. 62/023,189, filed on Jul. 11, 2014.

(51) Int. Cl.
*H04W 72/04* (2009.01)
*H04L 5/00* (2006.01)
(Continued)

(52) U.S. Cl.
CPC ......... *H04W 72/0446* (2013.01); *H04L 5/001* (2013.01); *H04L 5/0048* (2013.01);
(Continued)

(58) Field of Classification Search
None
See application file for complete search history.

(56) References Cited

U.S. PATENT DOCUMENTS

2004/0147287 A1* 7/2004 Nelson, Jr. .............. H01Q 3/26
455/561
2012/0020229 A1* 1/2012 Dayal .................. H04W 16/14
370/252
(Continued)

FOREIGN PATENT DOCUMENTS

CN 103039107 A 4/2013
CN 103095616 A 5/2013
(Continued)

OTHER PUBLICATIONS

3GPP TS 36.300 V12.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Mar. 2014, pp. 1-209.
(Continued)

*Primary Examiner* — Lonnie V Sweet
(74) *Attorney, Agent, or Firm* — Birch, Stewart, Kolasch & Birch, LLP

(57) ABSTRACT

A method and apparatus for receiving an indication of on/off state of past subframes in a wireless communication system is provided. A user equipment (UE) receives an indication of on/off state of past subframes for a specific time interval in a subframe, and perform measurement in subframes of on-state according to the received indication.

14 Claims, 6 Drawing Sheets

(51) Int. Cl.
*H04L 27/00* (2006.01)
*H04L 27/26* (2006.01)
*H04W 24/10* (2009.01)
*H04W 56/00* (2009.01)
*H04W 16/14* (2009.01)

(52) U.S. Cl.
CPC .......... *H04L 5/0094* (2013.01); *H04L 5/0096* (2013.01); *H04L 27/0006* (2013.01); *H04L 27/2601* (2013.01); *H04W 24/10* (2013.01); *H04W 56/00* (2013.01); *H04W 16/14* (2013.01)

(56) References Cited

U.S. PATENT DOCUMENTS

| | | | |
|---|---|---|---|
| 2013/0010715 A1* | 1/2013 | Dinan | H04W 72/0406 370/329 |
| 2014/0071937 A1* | 3/2014 | Klatt | H04L 5/001 370/330 |
| 2015/0009898 A1 | 1/2015 | Rosa et al. | |
| 2015/0117314 A1 | 4/2015 | Gou et al. | |
| 2015/0189627 A1 | 7/2015 | Yang et al. | |
| 2015/0256305 A1 | 9/2015 | Yerramalli et al. | |
| 2015/0296359 A1 | 10/2015 | Edge | |
| 2015/0373674 A1 | 12/2015 | Han et al. | |
| 2016/0007307 A1 | 1/2016 | Wei et al. | |
| 2016/0269978 A1 | 9/2016 | Bashar et al. | |
| 2016/0301504 A1 | 10/2016 | Toskala et al. | |
| 2016/0337176 A1 | 11/2016 | Lindoff et al. | |
| 2016/0337177 A1 | 11/2016 | Lindoff et al. | |
| 2016/0337997 A1 | 11/2016 | Huang et al. | |
| 2017/0318569 A1 | 11/2017 | Dinan | |
| 2018/0109968 A1 | 4/2018 | Luo et al. | |

FOREIGN PATENT DOCUMENTS

| | | |
|---|---|---|
| CN | 103563317 A | 2/2014 |
| CN | 103580840 A | 2/2014 |
| EP | 3148262 A1 | 3/2017 |
| WO | WO 2013/010323 A1 | 1/2013 |
| WO | WO 2013/063808 A1 | 5/2013 |
| WO | WO 2013/071506 A1 | 5/2013 |
| WO | WO 2014/007593 A1 | 1/2014 |

OTHER PUBLICATIONS

InterDigital, "Small cell On/Off Mechanism", R1-141554, 3GPP TSG-RAN WG1 Meeting #76bis Shenzhen, China, Mar. 31, 2014-Apr. 4, 2014, pp. 1-3.

LG Electronics, "Detailed discussons on new L1 procedure to support fast time-scale On/Off operation", R1-142135, 3GPP TSG WG1 Meeting #77 Seoul, Korea, May 19, 2014-May 23, 2014, pp. 1-5.

Qualcomm Incorporated, "Small cell on/off time reduction", R1-141956, 3GPP TSG-RAN WG1 #77 Seoul, Korea, May 19, 2014-May 23, 2014, pp. 1-6.

ZTE Corporation, "Discussion on Small Cell/TP On/Off Procedure", R2-141998, 3GPP TSG-RAN WG2 Meeting #86 Seoul Korea, May 19, 2014-May 23, 2014, pp. 1-7.

* cited by examiner

[Fig. 1]
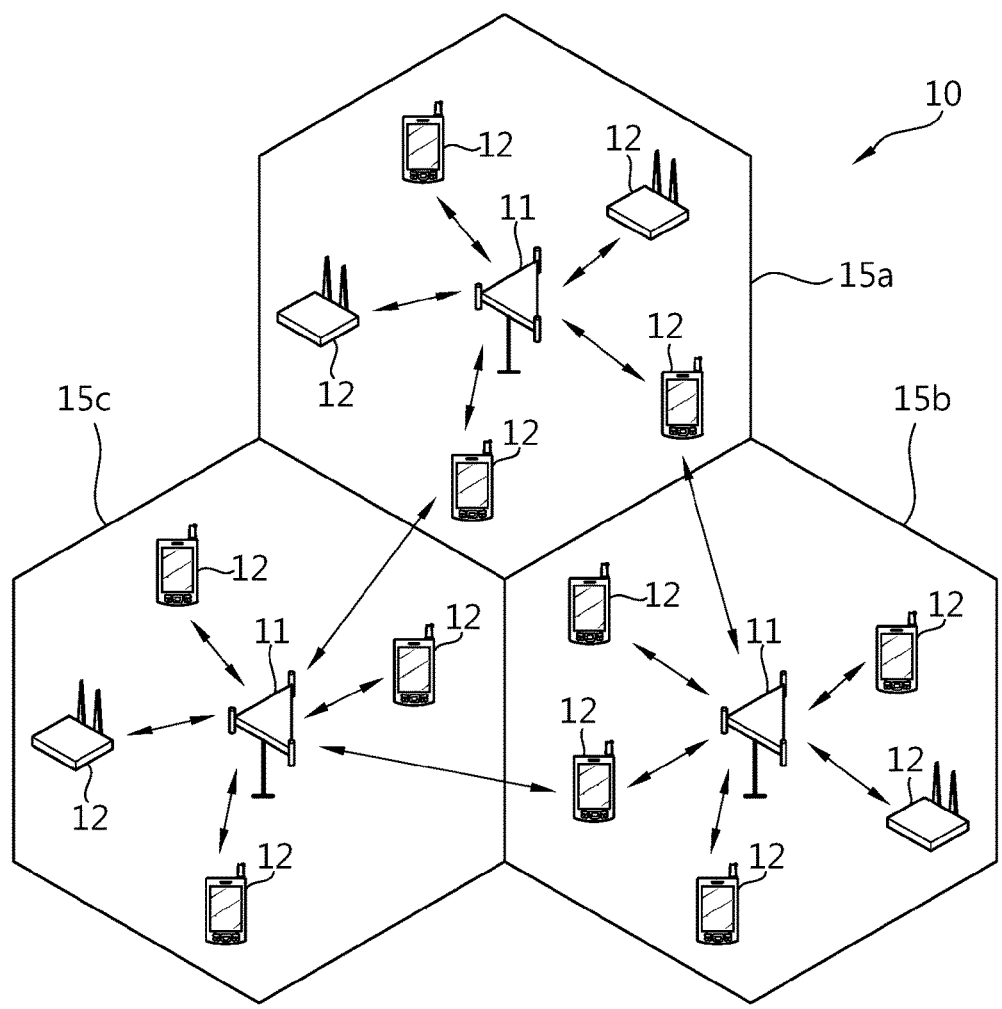
[Fig. 2]
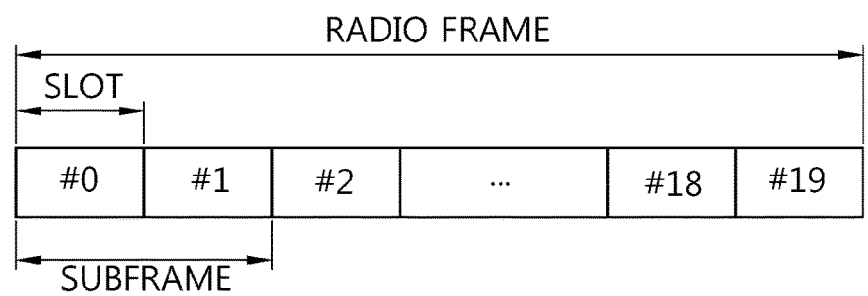

[Fig. 3]
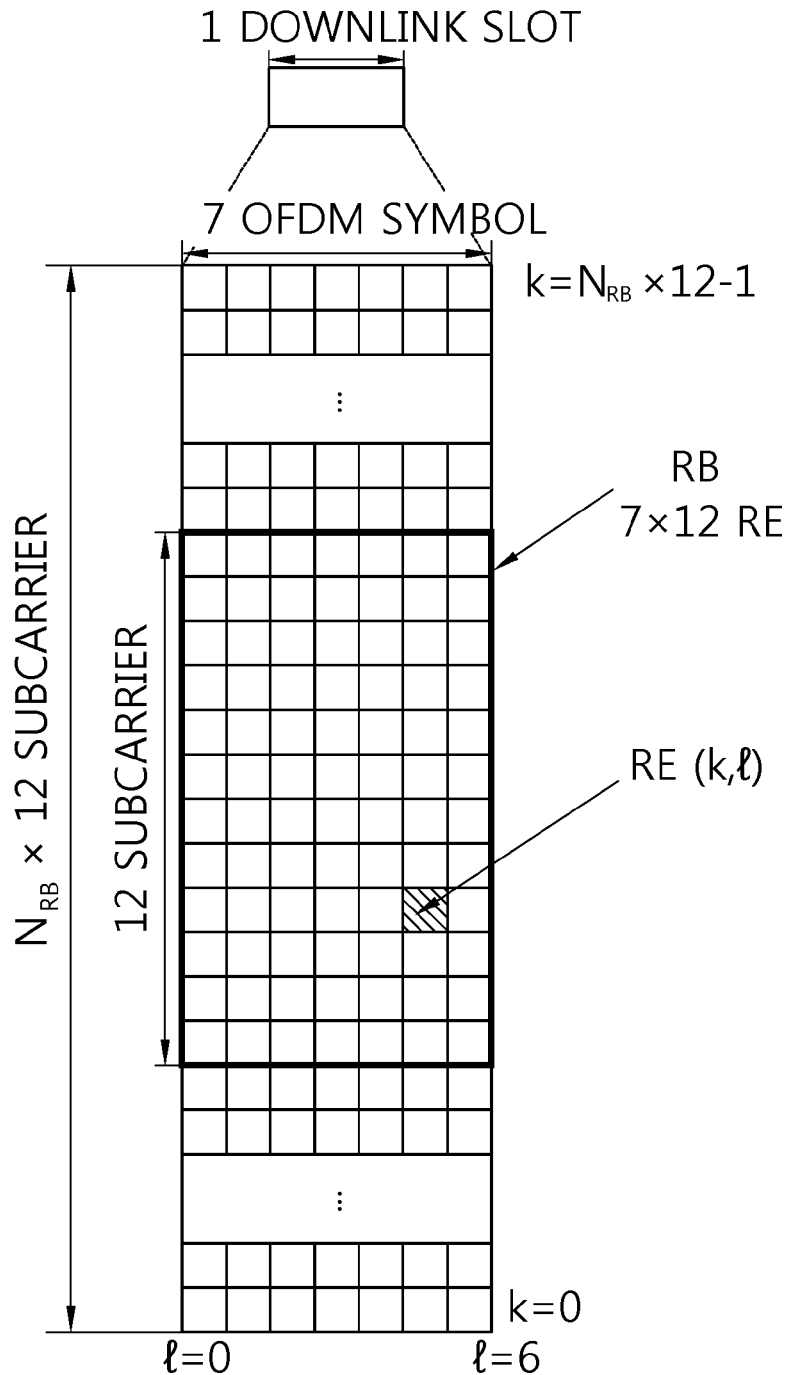

[Fig. 4]
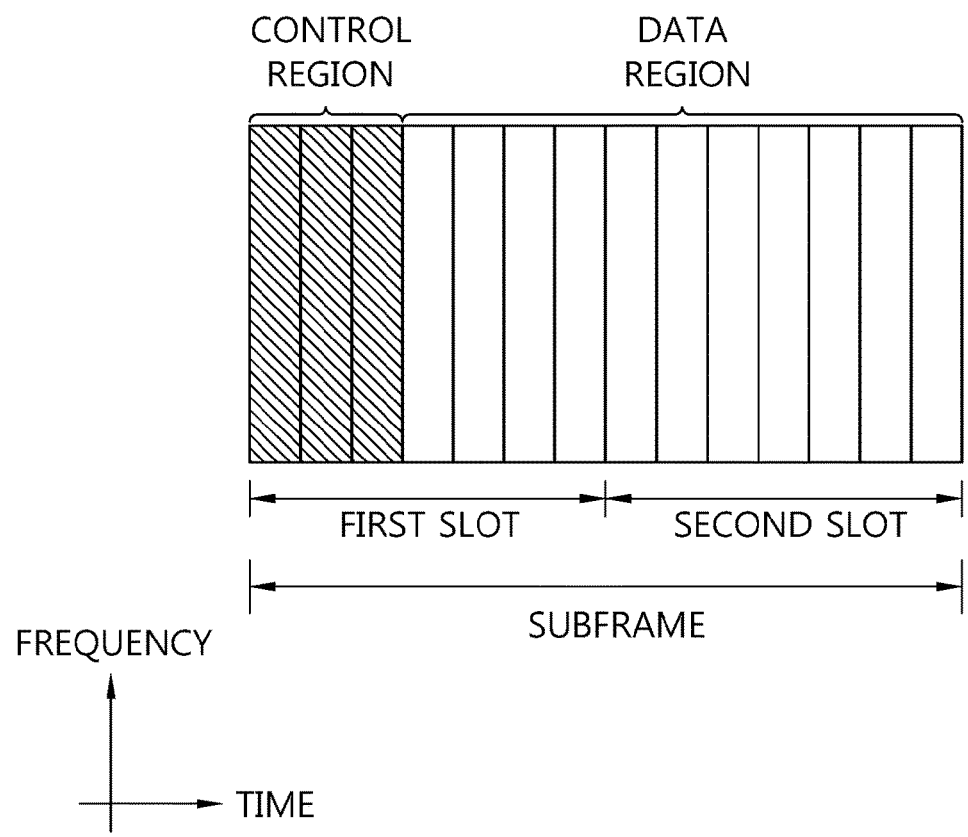

[Fig. 5]
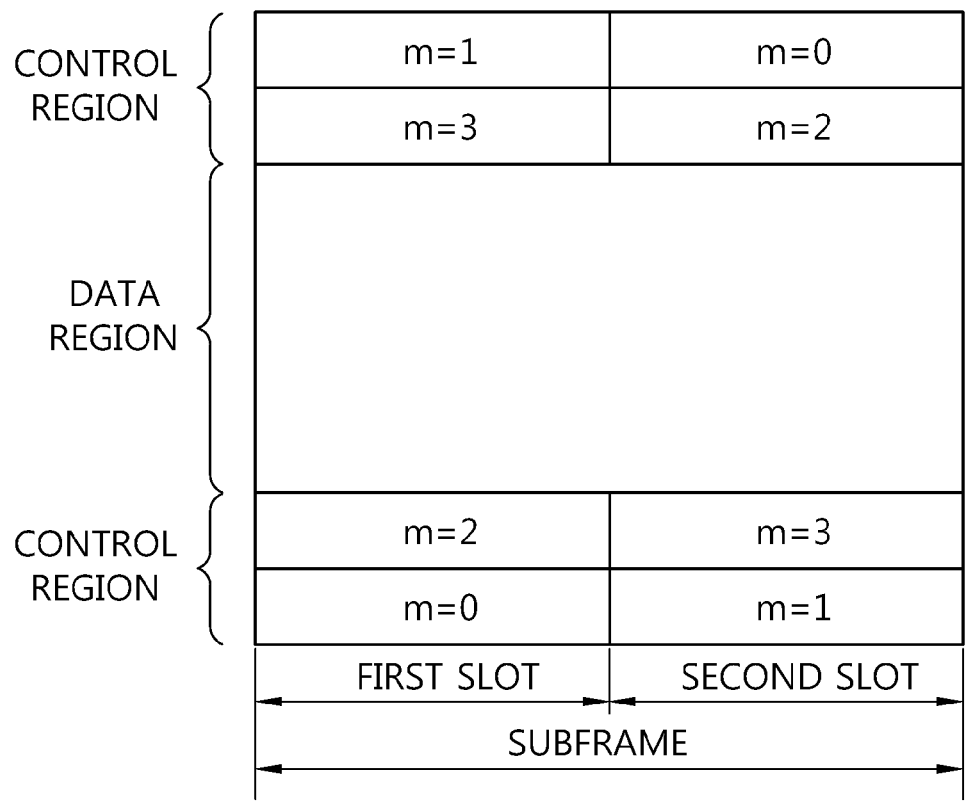

[Fig. 6]
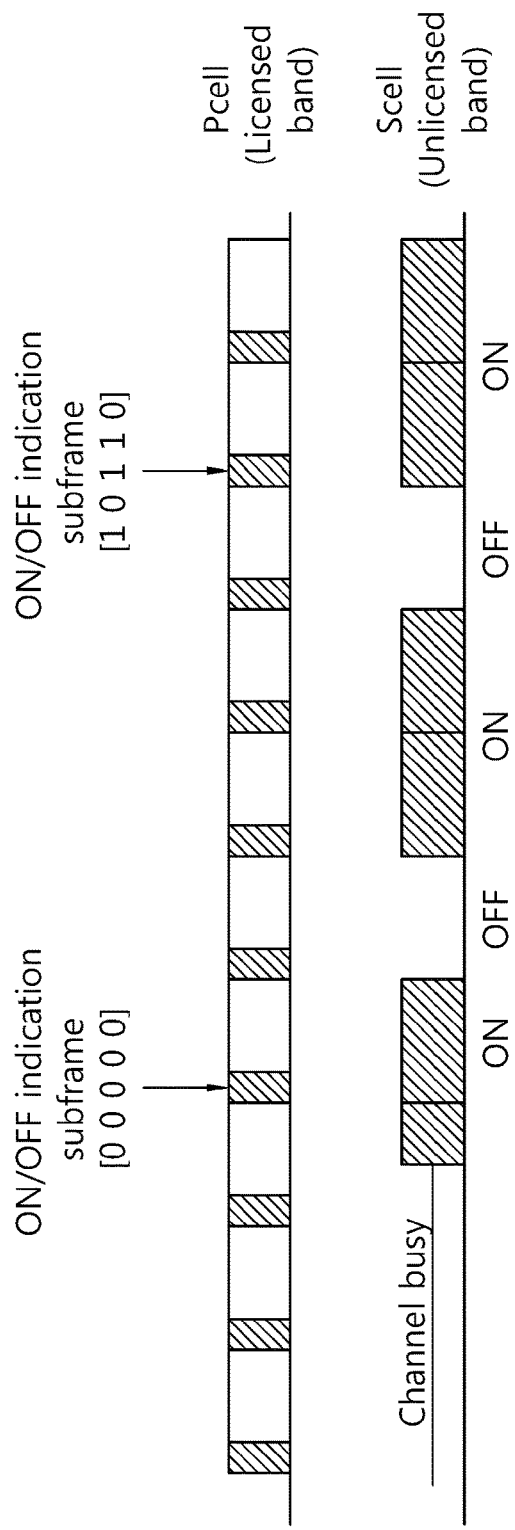

[Fig. 7]
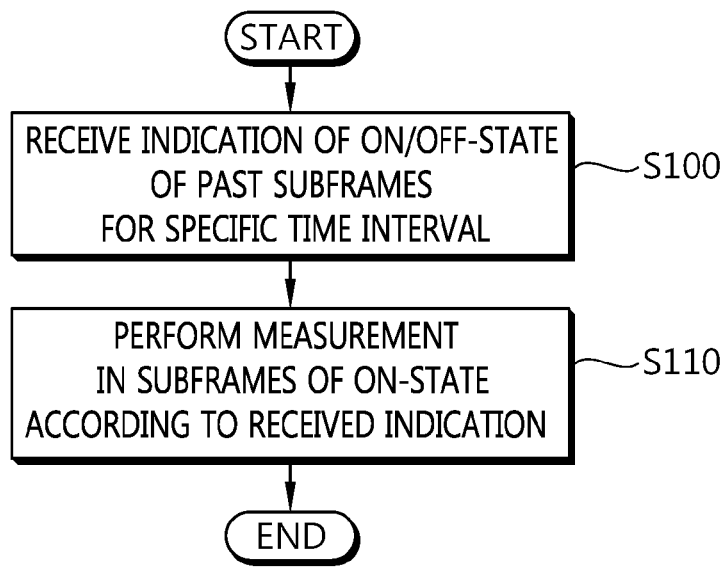
[Fig. 8]
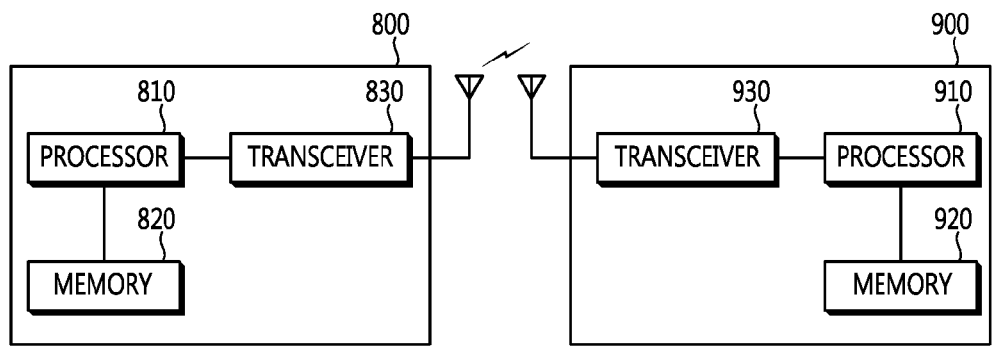

METHOD AND APPARATUS FOR INDICATING ON/OFF-STATE OF PAST SUBFRAMES IN WIRELESS COMMUNICATION SYSTEM

CROSS REFERENCE TO RELATED APPLICATIONS

This application is the National Phase of PCT International Application No. PCT/KR2015/005954, filed on Jun. 12, 2015, which claims priority under 35 U.S.C. 119(e) to U.S. Provisional Application No. 62/011,091, filed on Jun. 12, 2014 and 62/023,189, filed on Jul. 11, 2014, all of which are hereby expressly incorporated by reference into the present application.

TECHNICAL FIELD

The present invention relates to wireless communications, and more particularly, to a method and apparatus for indicating on/off-state of past subframes in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE may configure carrier aggregation (CA). In CA, two or more component carriers (CCs) are aggregated in order to support wider transmission bandwidths up to 100 MHz. A user equipment (UE) may simultaneously receive or transmit on one or multiple CCs depending on its capabilities. In CA, one primary cell (PCell) and at least one secondary cell (SCell) may be configured.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

As the demands on data rate keeps increasing, the utilization/exploration on new spectrum and/or higher data rate is essential. As one of a promising candidate, utilizing unlicensed spectrum, such as 5 GHz unlicensed national information infrastructure (U-NII) radio band, is being considered. A method for operating in unlicensed spectrum efficiently may be required.

DISCLOSURE OF INVENTION

Technical Problem

The present provides a method and apparatus for indicating on/off-state of past subframes in a wireless communication system.

Solution to Problem

In an aspect, a method for receiving, by a user equipment (UE), an indication of on/off state of past subframes in a wireless communication system is provided. The method includes receiving an indication of on/off state of past subframes for a specific time interval in a subframe, and performing measurement in subframes of on-state according to the received indication.

In another aspect, a user equipment (UE) includes a memory, a transceiver, and a processor coupled to the memory and the transceiver, and configured to control the transceiver to receive an indication of on/off state of past subframes for a specific time interval in a subframe, and perform measurement in subframes of on-state according to the received indication.

Advantageous Effects of Invention

It can be easy to indicate a cell status for unlicensed spectrum.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows an example of indication of on/off state of past subframes according to an embodiment of the present invention.
FIG. 7 shows an example of a method for indicating on/off state of past subframes according to an embodiment of the present invention.
FIG. 8 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Carrier aggregation (CA) is described. It may be referred to Section 5.5 and 7.5 of 3GPP TS 36.300 V12.1.0 (2014-03). A UE with single timing advance (TA) capability for CA can simultaneously receive and/or transmit on multiple CCs corresponding to multiple serving cells sharing the same TA (multiple serving cells grouped in one timing advance group (TAG)). A UE with multiple TA capability for CA can simultaneously receive and/or transmit on multiple CCs corresponding to multiple serving cells with different TAs (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG). The CA is supported for both contiguous and non-contiguous CCs with each CC limited to a maximum of 110 resource blocks in the frequency domain.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. It is not possible to configure a UE with more UL CCs than DL CCs. In typical time division duplex (TDD) deployments, the number of CCs and the bandwidth of each CC in UL and DL is the same. The number of TAGs that can be configured depends on the TAG capability of the UE. CCs originating from the same eNB need not to provide the same coverage.

When CA is configured, the UE only has one RRC connection with the network. At RRC connection establishment/re-establishment/handover, one serving cell provides the NAS mobility information (e.g. tracking area identity (TAI)), and at RRC connection re-establishment/handover, one serving cell provides the security input. This cell is referred to as the primary cell (PCell). In the DL, the carrier corresponding to the PCell is the DL primary CC (DL PCC), while in the UL, it is the UL primary CC (UL PCC).

Depending on UE capabilities, secondary cells (SCells) can be configured to form, together with the PCell, a set of serving cells. In the DL, the carrier corresponding to a SCell is a DL secondary CC (DL SCC), while in the UL, it is an UL secondary CC (UL SCC).

Therefore, the configured set of serving cells for a UE always consists of one PCell and one or more SCells. For each SCell, the usage of UL resources by the UE in addition to the DL resources is configurable (the number of DL SCCs configured is therefore always larger than or equal to the number of UL SCCs and no SCell can be configured for usage of UL resources only). From a UE viewpoint, each UL resource only belongs to one serving cell. The number of serving cells that can be configured depends on the aggregation capability of the UE. PCell can only be changed with handover procedure (i.e. with security key change and RACH procedure). PCell is used for transmission of PUCCH. Unlike SCells, PCell cannot be de-activated. Re-establishment is triggered when PCell experiences radio link failure (RLF), not when SCells experience RLF. NAS information is taken from PCell.

The reconfiguration, addition and removal of SCells can be performed by RRC. At intra-LTE handover, RRC can also add, remove, or reconfigure SCells for usage with the target PCell. When adding a new SCell, dedicated RRC signaling is used for sending all required system information of the SCell, i.e. while in connected mode, UEs need not acquire broadcasted system information directly from the SCells.

In unlicensed spectrum where LTE devices may coexist with other radio access technology (RAT) devices such as Wi-Fi, Bluetooth, etc., it is necessary to allow a UE behavior adapting various scenarios. In LTE in unlicensed spectrum (LTE-U), various aspects for 3GPP LTE described above may not be applied for LTE-U. For example, the TTI described above may not be used for LTE-U carrier where variable or floating TTI may be used depending on the schedule and/or carrier sensing results. For another example, in LTE-U carrier, rather than utilizing a fixed DL/UL configuration, dynamic DL/UL configuration based on scheduling may be used. However, due to UE characteristics, either DL or UL transmission may occur at time. For another example, different number of subcarriers may also be utilized for LTE-U carrier.

To support communication via LTE-U carrier successfully, as it is unlicensed, necessary channel acquisition and completion/collision handling and avoidance are expected. As LTE is designed based on the assumption that a UE can expect DL signals from the network at any given moment (i.e., exclusive use), LTE protocol needs to be tailored to be used in non-exclusive manner. In terms of non-exclusive manner, overall two approaches may be considered. One is to allocate channels for LTE and LTE-U in time domain by semi-statically or statically. For example, during day time, channels may be used by LTE, and during night time, channels may be not used by LTE. And the other is to compete for acquiring the channel dynamically. The reason for the completion is to handle other RAT devices/networks and also other operator's LTE devices/networks.

Depending on coexistence mechanism, it may not be feasible to assume that the network knows exact timing when the channel becomes available. For example, if time division multiplexing (TDM) based approach is used, each network may know in advanced when the channel becomes available for its use. However, such as collision sensing based approach is used for channel acquisition (channel can be acquired if nobody uses it), then knowing the exact timing of channel availability is not easy achievable.

As LTE frame structure is based on rather synchronized and deterministic way, if the channel acquisition time is not aligned with LTE frame structure, the utilization of acquired channel may not be fully achieved. This means that from a UE perspective, it may not know when exactly data is going to be transmitted.

In 3GPP Rel-12 LTE, it has been considered to introduce subframe-level on/off where explicit L1 signal may indicate on/off status of next subframe(s). Upon receiving the indication of on/off status of next subframe(s) from the network, the UE may perform measurement in only subframes where the subframe is on-state. If channel acquisition is needed before the transmission, from the network perspective, it may be ready for data transmission (by composing PDSCH, etc.). Given that channel acquisition may happen at any time, scheduling of PDSCH to one user at a time is desirable. However, it does not mean that scheduling at one time should be limited to one user.

The network may transmit PDSCH and/or tracking reference signal (RS) and/or feedback RS, such as CSI-RS, once it acquires the medium after medium access control. Since the channel acquisition may happen during a subframe, the actual transmission may happen either in the next subframe or in that subframe. If the transmission occurs in that subframe rather than the next subframe where channel acquisition has been accomplished, the indication of subframe, which is in on-state, may not occur in the same subframe due to the fact that PDCCH comes first in the subframe aligned with subframe boundary. In general, whenever the channel becomes idle, the network may transmit reference signals and/or PDSCH. However, depending on cases, it would not be easy to indicate the cell status in the same subframe when the cell becomes on-state.

In order to solve the problem described above, a method for indicating on/off-state of subframes via L1 signaling, which is applicable backward fashion rather than forward fashion. According to an embodiment of the present invention, the indication of on/off state of past subframe(s), rather than the indication of on/off state of next subframe(s), may be indicated.

FIG. 6 shows an example of indication of on/off state of past subframes according to an embodiment of the present invention. The indication of on/off state of subframes for the past 5 ms may be transmitted periodically from the PCell or from the SCell (or from the cross-carrier scheduling cell) via L1 signaling. Here, the PCell may correspond to the licensed band, i.e. LTE carrier, and the SCell may correspond to the unlicensed band, i.e. LTE-U carrier. However, the present invention is not limited thereto.

For example, referring to FIG. 6, if [0 0 0 0 0] has been indicated in a subframe from the PCell or from the SCell (or from the cross-carrier scheduling cell), it implies that all the subframes on the SCell (LTE-U carrier) were in off-state for the past 5 ms, which means that the channel of the SCell was busy for the past 5 ms. Even though the channel becomes available at the subframe, it may not be indicated as on-state subframe if transmission in the middle of subframe is not supported. On the other hand, the subframe may be indicated as on-state subframe where additional information may be given that the number of OFDM symbols of on-state subframe in that subframe as the transmission occurred in the middle of subframe. The indication may be cell-common or UE-specific or group-specific. In other words, L1 signaling may be transmitted via cell-specific search space (CSS) or UE-specific search space (USS) or group-based scheduling.

Thereafter, if [1 0 1 1 0] has been indicated in a subframe from the PCell or from the SCell (or from the cross-carrier scheduling cell), it implies that subframes on the SCell (LTE-U carrier) were in [on off on on off] state for past 5 ms. To support this capability, the UE needs to buffer raw data of a few ms as the indication or information how to decode may come in later timing.

In terms of motivation, in 3GPP LTE, it is typical to determine scheduling information in 5 ms in prior and the eNB scheduler needs to create PDCCH and perform multiplexing of PDCCHs to transmit PDSCH. In other words, for data transmission, first the UE reads the PDCCH, and then, the UE reads the PDSCH based on the information in the PDCCH. Since the control channel and data channel is separately transmitted in 3GPP LTE, whether the eNB can maintain the same timing between control channel and data channel or not may need some further considerations. Whereas, in Wi-Fi based on contention, the data transmission occurs right away where all the necessary control information is included in one packet.

Since the PDCCH needs to be multiplexed whereas PDSCH may be transmitted as per scheduling once the channel becomes idle, it is expected that the PDSCH may be transmitted right away whereas the PDCCH may need further to be delayed to allow multiplexing of multiple PDCCHs for different users. This may be necessary if cross-carrier scheduling is considered. For example, PDCCHs for PCell may include scheduling information for both the licensed carrier as well as unlicensed carrier. For the licensed carrier, deterministic transmission of the PDSCH may be assured, whereas for the unlicensed carrier, PDSCH transmission timing may not be deterministic. Thus, multiplexing of PDCCHs for the unlicensed carrier may be accomplished once the channel becomes idle in the unlicensed carrier. Or, if PDCCH/PDSCH is scheduled from the unlicensed carrier itself, even the PDCCH may be multiplexed in advance, then control/data may be transmitted right away once the channel becomes idle. In this case, the UE may have to perform blind detection on (E)PDCCH in the unlicensed carrier for data transmission in the PDSCH and may assume the subframe is in on-state when it detects PDCCH and/or cell-specific reference signal (CRS).

In the description above, even though it is assumed that measurement can be occurred in any time for measurement purpose, the concept of the present invention may be applied to discontinuous measurement signals as well, e.g. discovery RS (DRS). DRS may be transmitted rather periodically instead of continuously (e.g., every 40 ms), and in this case, the indication of on/off state of past subframes may be transmitted every 40 ms, instead of every 5 ms or every subframe. In other words, an explicit indication, which is periodic indication to notify whether the DRS transmission has been occurred or not, may be transmitted. In other words, the concept of the present invention may be applied for DRS transmission without loss of generality.

FIG. 7 shows an example of a method for indicating on/off state of past subframes according to an embodiment of the present invention. In step S100, the UE receives an indication of on/off state of past subframes for a specific time interval in a subframe. The indication may be received from a PCell which corresponds to a LTE carrier, or from a SCell which corresponds to a LTE-U carrier. The indication may be received via a CSS, a USS, or a group-based scheduling. The UE may further receive information indicating a number of on-state OFDM symbols in the subframe. In step S110, the UE performs measurement in subframes of on-state according to the received indication.

FIG. 8 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for receiving, by a user equipment (UE), an indication of on/off state of past subframes in a wireless communication system, the method comprising:
   receiving the indication of on/off state of past subframes,
   wherein the received indication informs the on/off state of past subframes for a specific time interval in the past; and
   buffering raw data for a few milliseconds (ms) by performing a measurement in the past subframes of on-state, which are informed by the received indication,
   wherein the on/off state is an on/off state of an unlicensed carrier,
   wherein the measurement is a measurement of frequency bands, and
   wherein a physical downlink shared channel (PDSCH) of past subframes is decoded based on buffered past subframes.

2. The method of claim 1, wherein the indication is received from a primary cell (PCell).

3. The method of claim 2, wherein the PCell corresponds to a long-term evolution (LTE) carrier.

4. The method of claim 1, wherein the indication is received from a secondary cell (SCell).

5. The method of claim 4, wherein the SCell corresponds to a long-term evolution unlicensed (LTE-U) carrier.

6. The method of claim 1, wherein the indication is received via a cell-specific search space (CSS), a UE-specific search space (USS), or a group-based scheduling.

7. The method of claim 1, further comprising:
   receiving information indicating a number of on-state orthogonal frequency division multiplexing (OFDM) symbols in the past subframes.

8. A user equipment (UE) comprising:
   a memory;
   a transceiver; and
   a processor coupled to the memory and the transceiver, and configured to:
   control the transceiver to receive of on/off state of past subframes,
   wherein the received indication informs the on/off state of past subframes for a specific time interval in the past; and
   buffer raw data for a few milliseconds (ms) by performing a measurement in the past subframes of on-state, which are informed by the received indication,
   wherein the on/off state is an on/off state of an unlicensed carrier, wherein the measurement is a measurement of frequency bands, and wherein a physical downlink shared channel (PDSCH) of past subframes is decoded based on buffered past subframes.

9. The UE of claim 8, wherein the indication is received from a primary cell (PCell).

10. The UE of claim 9, wherein the PCell corresponds to a long-term evolution (LTE) carrier.

11. The UE of claim 8, wherein the indication is received from a secondary cell (SCell).

12. The UE of claim 11, wherein the SCell corresponds to a long-term evolution unlicensed (LTE-U) carrier.

13. The UE of claim 8, wherein the indication is received via a cell-specific search space (CSS), a UE-specific search space (USS), or a group-based scheduling.

14. The UE of claim 8, wherein the transceiver is further configured to receive information indicating a number of on-state orthogonal frequency division multiplexing (OFDM) symbols in the past subframes.

* * * * *